UNITED STATES PATENT OFFICE 2,659,699

HYDRAULIC FLUID OF POLYHYDRIC ALCOHOL AND TRIALKYL PHOSPHATE

Melvin F. George, Jr., Los Angeles, and Perry M. Reedy, Jr., Burbank, Calif., assignors to Lockheed Aircraft Corporation, Burbank, Calif.

No Drawing. Application July 28, 1949,
Serial No. 107,373

13 Claims. (Cl. 252—78)

This invention relates to novel compositions of matter and to systems employing them. More particularly, this invention is directed to novel fluids finding particular application as hydraulic fluids in hydraulic systems for the transmission and application of power and also to said systems employing said novel fluids therein.

Hydraulic fluids for many years have been and still are used extensively in numerous types of hydraulic force or power transmitting and applying systems. One of the broad fields of application of such systems is in aircraft, where the hydraulic mechanisms are used to control and actuate control surfaces, such as, ailerons, rudders, etc., landing gears, brake systems, starting systems, etc.

Other instances where a non-flammable hydraulic fluid is desirable is in hydraulically operated manufacturing equipment where high pressure hydraulic lines are in close proximity to open fires, heated surfaces, or electrical hazards. An example of this is in the hydraulic operation of die-casting machines where the molten metal might ignite a flammable type hydraulic fluid in the event of line breakage. In such applications certain properties of the fluids such as the viscosity may require modification, while other requirements, such as viscosity index and pour point, may be less rigorous and still other characteristics such as stability and corrosion inhibition may remain about the same.

These various hydraulic systems in their elementary form comprise a pair of cylinders communicating with each other through a conduit containing a hydraulic fluid which is acted upon by a piston in one of the cylinders to transmit a force to a piston in the other cylinder. These systems, as employed in aircraft or the like have both dynamic and static packings or seals which are in contact with the hydraulic fluid. These packings or seals usually are composed, at least in part, of a rubbery material. While the rubbery materials employed have varied from time to time, practically all of the packing rubbery stocks now contain a rubbery copolymer of butadiene and acrylonitrile commonly known as "Buna N." Sometimes these rubbery materials are composed of the so-called "butyl rubber," which are synthetic rubbery copolymers of isobutylene and butadiene or other dienes such as isoprene. It is well known that certain of the synthetic hydraulic fluids proposed are unsatisfactory because when in contact with such packing materials, they cause said materials to swell to an extent far beyond acceptable limitations. In both the dynamics and static packings or seals, excessive swelling of the synthetic rubber material causes rapid deterioration of the packing and accompanying wear and, in the case of the dynamic seals, results in excessive friction. In the case of dynamic seals the maximum permissible swelling of the packing material is approximately 20%.

Consequently, in order that those fluids might be used, it would be necessary to replace all of the conventional packings or seals throughout the hydraulic systems with seals containing packing material that is more resistant to the swelling effect of those hydraulic fluids, but may be less desirable because of their poor durability characteristic, for example.

Besides having the characteristic of not causing excessive swelling of the packing material, the hydraulic fluid should possess adequate lubricity characteristics, suitable viscosity characteristics, be non-corrosive to the metal parts in the hydraulic system, be of relatively low specific gravity, of low toxicity, non-vesicant, have a pleasant odor and be non-flammable.

Petroleum base hydraulic fluids have been introduced and employed commercially which reasonably well satisfy most of these various requirements, but they are highly flammable and thus constitute a serious ever-present fire hazard in the aircraft. For this reason, a non-flammable hydraulic fluid, that has the several attributes adapting it for aircraft and analogous applications, has long been sought and many attempts have been made to provide such a fluid. Included among the hydraulic fluids that have been proposed for such uses are water-base fluids and fluids including highly chlorinated or fluorochloro compounds. In addition, considerable work has been done in an attempt to provide a satisfactory hydraulic fluid that is not altogether inflammable, but which is essentially fire retardant or fire resistant. This latter class of hydraulic fluids includes alkyl aryl phosphates and the like, used as a base stock. So far as we are aware, none of these attempts have been altogether successful, the fluids being unsatisfactory for one reason or another. For example, the water-base fluids have unsatisfactory temperature-viscosity characteristics and corrosion characteristics, the the highly halogenated materials are not practical from the standpoint of lubricity, metal corrosion and weight properties and may be highly toxic; while the alkyl aryl phosphate base fluids cause excessive swelling of the packing materials, have poor viscosity-temperature characteristics and have other disadvantages.

It is, therefore, an object of our present invention to provide hydraulic fluids that are non-flammable or substantially non-flammable and possess the several characteristics or attributes adapting them for use in the hydraulic systems or aircraft, automotive vehicles and other mechanisms where non-flammable fluids of this class are required. The fluids of the invention are substantially non-flammable, have excellent lubricity properties, relatively low specific gravity and good viscosity characteristics throughout an extremely wide temperature range. In actual comparative tests we have found that preferred hydraulic fluids of this invention are less flammable than either the water-base fluids of the highly halogenated type hydraulic fluids and, consequently, are much less flammable than the proposed partially non-flammable or so-called "interim fluids." The specific gravity of the present fluids, which is an important factor in aircraft applications, is in the order of one being much lower than some other proposed non-flammable hydraulic fluids. In the operation of aircraft, a single pound of weight reduction results in a substantial monetary saving computed on the basis of pay-load and fuel consumption for the expected operational life of the airplane. Accordingly, a reduction in the weight of the required hydraulic fluid is an important factor. Both the high temperature and the low temperature viscosity characteristics of the novel fluids are well within the rigid requirements of both civil and military aircraft, which are designed to operate under altitude and other conditions where the hydraulic fluid may reach a maximum temperature of 180° F. and a minimum temperature of —65° F.

It is another object of the invention to provide a non-flammable hydraulic fluid of the character referred to that does not cause excessive swelling of the packing materials now in general use in the hydraulic systems of aircraft and the like. The novel fluids of the invention have satisfactory and altogether acceptable packing swelling characteristics when used with the butadiene-acrylonitrile base packing stock which contains approximately 18% acrylonitrile and 82% butadiene marketed under the trade name "Perbenan 18" and compounded to meet the "AN-P-79" specification as well as with the "Buna N-Neoprene" composition compounded to meet the "AN-HH-P-144" specification, the "Neoprene" being polychloroprene, or with "butyl rubber."

Other objects and advantages of the invention will hereinafter become apparent from the following description which incorporates several examples of the hydraulic fluid formulations of the invention, it being understood that such examples are set forth merely by way of illustration and not in a limiting sense, all parts being given by volume unless otherwise specifically indicated.

Briefly, novel hydraulic fluids of this invention comprise the combination, in the nature of a blend or mixture, of one or more of the lower trialkyl esters of phosphoric acid and one or more aliphatic polyhydric alcohols which serve to inhibit the swelling effect of said esters, with or without viscosity improving compounds and/or corrosion inhibitors.

The alkyl phosphate or alkyl phosphates which comprise the base or principal ingredient of our hydraulic fluids are preferably those in which the number of carbon atoms in each alkyl group is less than 9 and generally in the range of 1-8, and the total number of carbon atoms of each of said esters is in the range of 6-24. It has been found that good low temperature viscosity characteristics and the non-flammability characteristics of the fluid are best obtained by the use of such lower trialkyl esters of phosphoric acid. Each of the alkyl groups of any one of said alkyl esters may be the same as or differ from the others, thus, either straight or mixed alkyl esters may be used. The following are some illustrative examples of trialkyl esters of phosphoric acid which have been found to be practical and effective in the hydraulic fluid formulations of the invention: triethyl phosphate; tributyl phosphate; triamyl phosphate; trihexyl phosphate; tri 2-ethylhexyl phosphate; etc.

Blends or mixtures of such trialkyl esters of phosphoric acids, or any one of them alone may be employed as the base or stock ingredient of the hydraulic fluid. For example, a blend of tributyl phosphate and triethyl phosphate in the proportion of from as high as one part of the tributyl phosphate for each part of the triethyl phosphate is practical and operative in formulations of the invention. In such a blend, the inherent properties of the two alkyl phosphates may well be utilized to advantage. Thus, because triethyl phosphate is more volatile than tributyl phosphate, the latter may be employed to advantage in the blend to control the relative evaporation rate of the compound, as will later become more apparent in connection with the description of the polyhydric alcohol additives which serve to limit or control the synthetic rubber packing swelling effect of the hydraulic fluid. The tributyl phosphate is less volatile but increases the packing swelling characteristic of the hydraulic fluid while the triethyl phosphate imparts superior flammability and viscosity characteristics so that by appropriately proportioning the two base stock constituents a given blend of hydraulic fluid may be obtained which has certain intended or desired packing swelling, viscosity and flammability properties. The ratio by volume of these particular esters is preferably in the range of 1 part of the tributyl ester to 1-10 parts of the triethyl ester. The alkyl phosphate or alkyl phosphate mixture is employed in the hydraulic fluid of the invention in the proportion of from 50% to 90% by volume, and in general at least 50% by volume.

Said trialkyl phosphates, either alone or in combination cause considerable swelling of the synthetic rubber packing materials now currently embodied in the hydraulic systems of aircraft and the like. We have found that this packing swelling effect is materially reduced and brought well within the required limits without markedly impairing the inherently superior flammability and temperature viscosity characteristics of the alkyl phosphate base fluids, by combining therewith one or more aliphatic polyhydric alcohols. The aliphatic polyhydric alcohols employed herein are those which are at least 10% miscible with any of said trialkyl esters, have boiling points preferably greater than that of the ester with which it is combined, will not cause appreciable swelling of "Buna N" and will inhibit materially the swelling action of the alkyl esters when "Buna N" is subjected to the swelling action of the alkyl ester-polyhydric alcohol combinations of this invention. The following are some illustrative examples of some of said aliphatic polyhydric alcohols: glycerine; ethylene glycol; diethylene glycol; propylene glycol; butylene glycol (butenediol 1,3); tetraethylene glycol; polypropylene glycol of 400-1200 molecular weight, etc.

The concentration or proportion or the alcohol employed depends to a large extent upon the particular alkyl phosphate that is used as the base or stock material of the hydraulic fluid. For example, a lower concentration or proportion of the polyhydric alcohol is required when triethyl phosphate is the stock constituent of the fluid than in the case where tributyl phosphate is employed. In general, ratio by volume of the packing swell inhibitor or polyhydric alcohol to the trialkyl ester is in the range of 45–55 to 10–90, and the maximum is preferably 35–65.

In general, when glycerol is employed, the hydraulic fluids preferably comprise 50%–90% by volume of one or a combination of two or more of the trialkyl esters and 10%–35% of the glycerol and when triethyl phosphate is the ester used, the hydraulic fluids preferably comprise 50%–90% by volume of triethyl phosphate and 10%–25% by volume of one or a combination of two or more of said polyhydric alcohols and preferably glycerol.

In actual synthetic packing rubber swell tests we have found that where the currently approved Army-Navy packing composition, which is compounded to meet the "AN-P-79" specification, is subjected to the swelling action of the hydraulic fluids at approximately 158° F. for seven days' duration in a triethyl phosphate base fluid containing 10% by volume of glycerol the swelling of the packing rubber is only 27% and that where 15% by volume of the glycerol is used the swelling of the synthetic rubber is reduced to 16.8%. Under the same conditions and in a triethyl phosphate base fluid, a 20% by volume concentration of the glycerol reduces the packing swell to 11.5% and a 25% by volume concentration of the glycerol reduces the packing swell to 8%. Under similar conditions triethyl phosphate alone causes a swelling of this packing stock of about 70%. In like tests employing triethyl phosphate as the base stock of the fluid, 25% by volume of the ethylene glycol held the packing rubber swell to 12% and 25% by volume of diethylene glycol held the rubber swell to 23%. From the data derived from numerous tests wherein the concentrations of the swell inhibitors were varied from 25% to 0% by volume, it appears that swelling of the synthetic rubber packing material is a function of the mol ratio of the swell inhibitor to the triethyl phosphate or other base stock of the fluid and in the case of the triethyl phosphate and glycerine blend this function is linear between a mol ratio of 1.25 and 3.9 expressed as a mol ratio of triethyl phosphate to glycerine. Such concentrations of the polyhydric alcohol swell inhibitors do not materially adversely affect the valuable non-flammability and temperature-viscosity characteristics of the alkyl phosphate base stocks.

Where tributyl phosphate constitutes the primary constituent of the hydraulic fluid, trihydric alcohols, such as glycerine, markedly reduce the packing swelling effect of the hydraulic fluid, but owing to the greater swelling effect of the tributyl phosphate upon the synthetic rubber packing materials, it may not always be desirable to employ tributyl phosphate as the sole alkyl phosphate base constituent where the hydraulic fluid is intended to be used with the currently employed types of packing material. Accordingly, it may be found desirable to employ a blend of triethyl phosphate and tributyl phosphate in such cases so that the glycerol, or other swell inhibitor, may be used in sufficiently high and yet compatible concentrations to retain the packing swell effect of the product within the required limits.

The relative evaporation rates of the hydraulic fluid constituents should be taken into account in order to maintain the flammability of the fluid at a minimum. Thus, where triethyl phosphate is used as the base stock, the additives preferably have boiling points in excess of 225° C. and where tributyl phosphate is the base stock constituent, it is preferable to employ the less volatile glycols having boiling points in excess of 280° C. as the swell inhibiting additives. In this connection it may be noted that it has been found where the dihydric compounds or glycols are employed as the packing swell inhibitors, the swelling inhibition action decreases as the ratio of the carbon atoms to the hydroxyl groups increases. Thus ethylene glycol is more effective than propylene glycol in preventing swelling of the packing materials, propylene glycol is more effective than butylene glycol, and so on. We have also found that greater relative proportions or amounts of the dihydric compounds or glycols are required to obtain a given packing swell inhibiting effect than when the trihydric compounds are used. Thus ethylene glycol is less effective in terms of volume percentage or mol percentage of the hydraulic fluid than is glycerol, even though ethylene glycol has the same ratio of the hydroxyl groups to the carbon atoms.

Although the trialkyl ester-polyhydric alcohol combinations unmodified find highly useful applications as hydraulic fluids in said systems, it sometimes is found desirable or necessary to incorporate viscosity improving additives in said hydraulic fluid formulations to enhance their temperature-viscosity characteristics. Generally the ratio by volume of the viscosity improving additive to the sum of the volumes of the trialkyl ester and the polyhydric alcohol is in the range of 5–95 to 20–80. We have found that a monoether of a polyoxy alkylene oxide polymer, such as is known commercially as Ucon Lubricant (No. 50 HB 5100X), is effective for this purpose. When approximately 15% by volume of this type of thickener is employed in a triethyl phosphate-glycerine blend, the viscosity of the hydraulic fluid is approximately 12 centistokes at 100° F. and approximately 500 centistokes at −40° F. It will be understood that where polymers of higher molecular weights are employed, improved low temperature-viscosity characteristics are obtained and less of the polymer may be required. Examples of such higher molecular weight thickeners are Ucon 50 HB 51400X and Ucon 50 HB 6781X.

The hydraulic fluids of the invention are not corrosive to steel, aluminum, or copper. The invention also contemplates that suitable antioxidants, such as phenylalphanaphthylamine, or substituted phenols such as di-tertiary butyl cresol may be incorporated in the fluids in selected concentrations. It may also be found desirable or necessary to include corrosion inhibiting additives in the hydraulic fluid where the fluid is to come into contact with cadmium. Butylated hydroxyanisole or di-isobutyl ketone, used in the proportion of from 0.5% to 2.5% by volume have been found to be effective in preventing the corrosion of cadmium plated steel. These additives are effective even in extremely adverse conditions, for example when as high as 10% by volume of water is added to the hydraulic fluid to increase the hydrolytic effect beyond that which would ever be encountered in the actual use of the fluid.

The following are typical formulations of the hydraulic fluids embodying the invention:

Example 1

| | Parts by volume |
|---|---|
| Triethyl phosphate | 85 |
| Glycerine | 15 |
| Polyoxy alkylene oxide polymer (Ucon No. 50 HB 5700X) | 15 |

When desired or necessary, 1 part by volume of butylated hydroxyanisole may be incorporated in the formulation of Example 1 as a corrosion and oxidation inhibitor. The hydraulic fluid of Example 1 has been found to have excellent viscosity characteristics and is non-flammable for all practical purposes. Its specific gravity is approximately 1 and the fluid has approximately the same packing rubber swelling characteristics as the present-day petroleum base fluids when used with the currently standard synthetic rubber packing materials. In comparative tests it has been found that the hydraulic fluid of Example 1 is less flammable than either the water-base fluids or the completely halogenated fluids.

Example 2

| | Parts by volume |
|---|---|
| Triethyl phosphate | 70 |
| Glycerine | 10 |
| Polyoxy alkylene oxide polymer (Ucon No. 50 HB 5100X) | 20 |

At a temperature of 100° F. the fluid of Example 2 has a viscosity of 14.5 centistokes and at a temperature of —40° F. the fluid has a viscosity of 600 centistokes. Under the test conditions described above, the fluid of Example 2 produces only 16% swelling of the "AN-P-79" type rubber packing stock.

Example 3

| | Parts by volume |
|---|---|
| Triethyl phosphate | 68.3 |
| Glycerine | 13.7 |
| Polyoxyalkylene oxide polymer (Ucon No. 50 HB 5100X) | 17.6 |

With the fluid of Example 3 at a temperature of 100° F. it has a viscosity of 14.7 centistokes and at a temperature of —40° F. the fluid has a viscosity of 890 centistokes. The hydraulic fluid of Example 3 used under the above described test conditions produces 11.7% swelling of the "AN-P-79" rubber stock.

Example 4

| | Parts by volume |
|---|---|
| Triethyl phosphate | 66 |
| Glycerine | 22.2 |
| Polyoxyalkylene oxide polymer (Ucon No. 50 HB 5100X) | 11.1 |

At a temperature of 100° F. the fluid of Example 4 has a viscosity of 13.3 centistokes and at a temperature of —40° F. the fluid has a viscosity of 1000 centistokes. The fluid of Example 4 produces only 7.0% swelling of the "AN-P-79" rubber stock under the above described rubber swelling test.

Example 5

A blend of:

| | | |
|---|---|---|
| Triethyl phosphate | parts by volume | 53 |
| Tributyl phosphate | do | 27 |
| Glycerol | do | 20 |
| Viscosity in centistokes at 100° F | | 5.1 |
| Viscosity in centistokes at —40° F | | 260 |

Example 6

A blend of:

| | | |
|---|---|---|
| Triethyl phosphate | parts by volume | 40 |
| Tributyl phosphate | do | 40 |
| Glycerol | do | 10 |
| Viscosity in centistokes at 100° F | | 3.5 |
| Viscosity in centistokes at —40° F | | 95 |

Example 7

A blend of:

| | |
|---|---|
| Triethyl phosphate | 53 parts by volume |
| Tributyl phosphate | 27 parts by volume |
| Glycerol | 20 parts by volume |
| Ucon 50 HB 51,400 | 8 grams per 100 ml. of the phosphate - glycerol base |
| Viscosity in centistokes at 100° F. | 13.5 |
| Viscosity in centistokes at —40° F. | 810 |

Example 8

A blend of:

| | |
|---|---|
| Triethyl phosphate | 40 parts by volume |
| Tributyl phosphate | 40 parts by volume |
| Glycerol | 10 parts by volume |
| Ucon 50 HB 51,400 | 11.1 grams per 100 ml. of the phosphate - glycerol base |
| Viscosity in centistokes at 100° F. | 13 |
| Viscosity in centistokes at —40° F. | 500 |

Example 9

| | Parts by volume |
|---|---|
| Triethyl phosphate | 60 |
| Ethylene glycol | 20 |
| Polyoxyalkylene oxide polymer (Ucon No. 50 HB 5100X) | 20 |

The hydraulic fluid of Example 9 has a viscosity of 13.3 centistokes at a temperature of 100° F. and a viscosity of 470 centistokes at —40° F. This composition swells the "AN-P-79" rubber composition 12% under the above described testing conditions. The fluid of Example 9 has been found to be only slightly inferior to the glycerine containing fluids of Examples 1 to 4 inclusive insofar as the fire resistant characteristics are concerned, and is far superior to the other non-flammable fluids with which we are familiar.

Example 10

| | Parts by volume |
|---|---|
| Tri-n-butyl phosphate | 75 |
| Pentanediol 1,5 | 10 |
| Polyoxyalkylene oxide polymer (Ucon No. 50 HB 5100X) | 15 |

The viscosity of this hydraulic fluid composition at a temperature of 100° F. is 13.6 centistokes and its viscosity at —40° F. is 570 centistokes. This fluid has excellent flammability characteristics but is preferably employed where "butyl rubber" packing stock is present in the hydraulic system operating to produce a swelling of the butyl rubber packing of approximately 6% under the above test conditions.

Example 11

| | Parts by volume |
|---|---|
| Polypropylene glycol (molecular weight 1200) | 40 |
| Tri-n-butyl phosphate | 50 |
| Ethylene glycol | 10 |

The viscosity of the composition of Example 11 at 100° F. is 12.9 centistokes and at a temperature of −40° F. the viscosity of the fluid is 1330 centistokes. This fluid is much less flammable than the hydraulic fluids presently used in aircraft and produces only 16% swelling of the "AN-HH-P114" rubber packing stock under the above described test conditions and occasions only 1.4% swelling of the packing rubber stock prepared from "butyl rubber."

Example 12

| | Parts by volume |
|---|---|
| Tri-n-amyl phosphate | 60 |
| Tri-n-butyl phosphate | 10 |
| Pentanediol-1,5 | 25 |
| Polyoxyalkylene oxide polymer (Ucon No. 50 HB 5100X) | 10 |

At a temperature of 100° F. the hydraulic fluid of Example 12 has a viscosity of 18 centistokes and at a temperature of −40° F. the fluid has a viscosity of 1200 centistokes. This fluid is markedly less flammable than the present-day hydraulic fluids and produces only 21% swell of the "Neoprene"-"Buna N" rubber packing stock known as "AN-HH-P-114" under the above described test conditions.

Example 13

| | Parts by volume |
|---|---|
| Tri-n-butyl phosphate | 64 |
| Ethylene glycol | 21 |
| Polyoxyalkylene oxide polymer (Ucon No. 50 HB 5100X) | 15 |

The viscosity of the fluid of Example 13 is 16.4 centistokes at 100° F. and is 900 centistokes at −40° F. Under the above described test conditions, this fluid swells the "AN-HH-P-114" packing stock 21% and swells the butyl type rubber stock 2.3% under the same test conditions. The hydraulic fluid of Example 13 has relatively good flammability characteristics.

Example 14

| | Parts by volume |
|---|---|
| Tri-2-ethylhexyl phosphate | 80 |
| 2-methyl-2,4 pentanediol | 15 |
| An oil soluble polymethacrylate of the type sold under the trade name "Acryloid 855" | 5 |

The viscosity of the hydraulic fluid of Example 14 at 100° F. is 14.2 centistokes and at a temperature of −40° F. the fluid has a viscosity of 1330 centistokes. Although the fire resistance of this fluid is not so high as found in the other formulations of the invention, its flammability characteristics are far superior to the currently employed hydraulic fluids. Under the test conditions described above, the hydraulic fluid of Example 14 swells the "AN-HH-P-144" packing rubber stock about 25%.

When desired, and when the conditions of intended use of the fluid dictates, the formulations of Examples 1 to 14 inclusive may incorporate one or more selected antioxidants and corrosion inhibitors, for example each fluid may include from 0.25% to 2.0% by volume of the butylated hydroxyanisole or the di-isobutyl ketone to inhibit cadmium corrosion. In most instances it is usually preferred to employ 1% by volume of the butylated hydroxylated anisole or di-isobutyl ketone when desired to reduce cadmium corrosion.

Moreover, the polyoxy alkalene oxide polymers may all be omitted from any of the formulations included in the various examples herein to provide improved hydraulic fluids, whose viscosity-temperature characteristics, while suitable for some purposes, are not quite as good for other purposes due to the omission of the viscosity index improver therefrom.

The hydraulic fluids of the invention find particular use as the fluid in the systems hereinbefore described and have high auto ignition temperatures. For example, the fluid of formulation of Example 2 has an apparent auto ignition temperature of 1300° F. as determined by forcing the liquid through a small orifice under high pressure onto a hot bearing, the lowest temperature at which fluid ignites being considered the auto ignition temperature. However, auto ignition values vary in accordance with their method of determination and although a fluid may be ignited, it does not necessarily burn or support combustion and fluids which have a higher auto ignition point than the fluids of the invention have been found to be considerably more flammable.

The fluids of the invention are non-flammable for all practical purposes and have excellent lubricity characteristics and viscosity characteristics, the latter being determined to a large degree by the relative proportion of the thickener or viscosity index improver employed in the given formulations. As above described, the preferred fluids of the invention do not cause excessive swelling of the packing rubber stocks of the classes employed in aircraft hydraulic systems. Furthermore, these fluids are non-irritating to the human skin. etc. and have a pleasant odor and their flammability characteristics do not alter to any appreciable extent after being exposed to the atmosphere for prolonged periods as when spilled or allowed to collect in an aircraft structure as a result of leakage. The fluids of the invention incorporating the triethyl phosphate do not produce irritating fumes or sooty products even under fire conditions.

It is to be understood that the following claims are intended to be inclusive in scope and not exclusive, and that if desired, other materials may be added to the novel compositions of matter herein claimed without departing from the spirit of the invention. Particularly, it is to be understood that in said claims ingredients or components recited in the singular are intended to include compatible mixtures of said ingredients wherever the sense permits.

We claim:

1. A hydraulic fluid comprising the combination of one or more trialkyl phosphates, each of said phosphates having a total of 6–24 carbon atoms, with each of its alkyl groups having less than 9 carbon atoms and an aliphatic polyhydric alcohol component capable of materially inhibiting the swelling effect of said trialkyl phosphate on a copolymer of butadiene and acrylonitrile, said aliphatic polyhydric alcohol component being miscible with said trialkyl phosphate in the volume ratio of at least 10 parts of said aliphatic polyhydric alcohol component to 90 parts of said trialkyl phosphate, the volume ratio of said trialkyl phosphate to said aliphatic polyhydric alcohol component of said fluid being in the range of 90–10 to 55–45, said trialkyl phosphate being present in said fluid to the extent of 50–90% by volume, said aliphatic polyhydric alcohol component selected from the group consisting of glycerol, ethylene glycol, diethylene glycol, propylene glycol, butylene glycol, tetraethylene glycol, polypropylene glycol of 400–1200 molecular weight and mixtures thereof.

2. An hydraulic fluid comprising one or more trialkyl phosphates, each of said phosphates having a total of 6–24 carbon atoms, with each alkyl group having less than 9 carbon atoms, and aliphatic polyhydric alcohol component capable of materially inhibiting the swelling effect of said trialkyl phosphate on a copolymer of butadiene and acrylonitrile, said polyhydric alcohol component being miscible with said trialkyl phosphate in the volume ratio of at least 10 parts of said polyhydric alcohol component to 90 parts of said trialkyl phosphate, the volume ratio of said trialkyl phosphate to said polyhydric alcohol component being in the range of 90–10 to 65–35, said trialkyl phosphate being present in said fluid to the extent of at least 50% by volume, said aliphatic polyhydric alcohol component selected from the group consisting of gylcerol, ethylene glycol, diethylene glycol, propylene glycol, butylene glycol, tetraethylene glycol, polypropylene glycol of 400–1200 molecular weight and mixtures thereof.

3. An hydraulic fluid according to claim 2, the polyhydric alcohol component being glycerol.

4. An hydraulic fluid according to claim 2, the polyhydric alcohol component being ethylene glycol.

5. An hydraulic fluid according to claim 2, the polyhydric alcohol component being diethylene glycol.

6. An hydraulic fluid according to claim 2, and a polyoxyalkylene polymer thickener soluble in said combination of said trialkyl phosphate component and said polyhydric alcohol component.

7. An hydraulic fluid according to claim 2, the trialkyl phosphate being triethyl phosphate.

8. An hydraulic fluid according to claim 2, the trialkyl phosphate being tributyl phosphate.

9. An hydraulic fluid according to claim 2, the trialkyl phosphates being triethyl phosphate and tributyl phosphate, the ratio by volume of triethyl phosphate to tributyl phosphate in said hydraulic fluid being in the range of 1 part of tributyl phosphate to 1–10 parts of triethyl phosphate.

10. An hydraulic fluid comprising triethyl phosphate and glycerol in the volume ratio range of 90–10 to 65–35, the volume of triethyl phosphate in said fluid being at least 50% of the volume of said fluid.

11. An hydraulic fluid according to claim 10, and a quantity of a polyoxyalkylene polymer for thickening said fluid and being soluble therein.

12. An hydraulic fluid comprising (a) triethyl phosphate and tributyl phosphate in the volume ratio of 1–10 parts of the former to 1 part of the latter, (b) glycerol, the ratio of the sum of the volume of said phosphates to the volume of said glycerol being in the range of 90–10 to 65–35, the sum of the volumes of said phosphates being at least 50% of the volume of said fluid.

13. An hydraulic fluid according to claim 12, and a quantity of a polyoxyalkalene polymer for thickening said fluid and being soluble therein.

MELVIN F. GEORGE, Jr.
PERRY M. REEDY, Jr.

References Cited in the file of this patent

UNITED STATES PATENTS

| Number | Name | Date |
|---|---|---|
| 2,003,429 | Cox | June 4, 1935 |
| 2,337,650 | Dolian | Dec. 28, 1943 |
| 2,345,586 | Clark | Apr. 4, 1944 |
| 2,410,608 | Morgan | Nov. 5, 1946 |
| 2,469,285 | White | May 3, 1949 |
| 2,470,792 | Schlesinger | May 24, 1949 |
| 2,507,401 | Doeling | May 9, 1950 |
| 2,549,270 | Watson | Apr. 17, 1951 |

OTHER REFERENCES

Russ: "Properties and Uses of Some New Synthetic Lubricants," Lubrication Engineering, December 1946, pp. 151–157.

Chem. Industries, December 1946, pp. 1012–1015; Fain: "Brake Fluids Face a Lively Future."

Hycar Blue Book, August 1, 1946, B. F. Goodrich Chemical Co., Cleveland, Ohio; Sec. VI, Group B, Table 1A.

I. and E. Chem., vol. 30, No. 4, pp. 422–427, April 1938; Fulton: "Hydraulic Brake Fluids."

Moreton: "Development and Testing of Fire-Resistant Hydraulic Fluids," Pamphlet of the Society of Automotive Engineers Inc. Preprint for presentation of the S. A. E. Annual Meeting, Hotel Book-Cadillac, Detroit, Mich., January 10–14, 1949.